(12) United States Patent
Timmerman et al.

(10) Patent No.: US 6,404,326 B1
(45) Date of Patent: Jun. 11, 2002

(54) REDUNDANT POWER COMMUNICATIONS CIRCUIT

(75) Inventors: Ross G. Timmerman, Jenison; Krzysztof R. Russa, Grandville; Alan S. Hughes, Holland, all of MI (US)

(73) Assignee: Johnson Controls Interiors Technology Corp., Holland, MI (US)

( * ) Notice: Subject to any disclaimer, the term of this patent is extended or adjusted under 35 U.S.C. 154(b) by 0 days.

(21) Appl. No.: 09/566,453

(22) Filed: May 8, 2000

(51) Int. Cl.[7] .................................................. G08B 1/00
(52) U.S. Cl. ............................ 340/286.01; 340/310.01; 340/310.06; 307/310.01; 307/12
(58) Field of Search ....................... 340/825.06, 825.16, 340/286.01, 310.01, 310.06; 307/11, 12

(56) References Cited

U.S. PATENT DOCUMENTS 5,600,310 A * 2/1997 Whipple, III et al. .. 340/825.06
6,111,524 A * 8/2000 Lesesky et al. ............. 340/942

* cited by examiner

Primary Examiner—Julie Lieu
(74) Attorney, Agent, or Firm—Foley & Lardner

(57) ABSTRACT

A redundant power and communications network that is generally fault tolerant and generally immune to single point failure. A primary or master node communicates via a standard multiplex protocol to the control infrastructure of a vehicle. The master node, in a subnetwork or supplementary communications bus, further communicates with one or a plurality of slave nodes in a local vehicle area or structure such as a seat. The main multiplex network and subnetwork are bridged by the master node, which transfers information between the main multiplex network and the subnetwork.

23 Claims, 5 Drawing Sheets

REDUNDANT POWER COMMUNICATIONS CIRCUIT

BACKGROUND OF THE INVENTION

The present invention relates to a multiplex system in a vehicle, and more particularly, to a power and communications network in a vehicle that is fault tolerant and immune to single point failure.

An area in the auto industry seeing tremendous change from past practices is the area of wiring and interconnects. The creation of relatively inexpensive microprocessors, and the digital revolution, have put the power of the computer into the hands of automotive engineers. Traditionally large bundles of wires were used to conventionally connect electrical devices in automobiles, each wire representing a single switching signal or analog value. These bundles of wires increased the weight, volume, and complexity of a vehicle. With the advent of automotive computer multiplexing networks such as the controller area network ("CAN"), Palmnet, Chrysler Collision Detection ("CCD"), and SAE J1850, many of these wires and their associated terminations and connectors can be eliminated. Large amounts of information can now be transferred between intelligent control devices in an automobile via a single wire.

Conventional multiplex applications utilizing single wire communication for control devices and instrumentation are vulnerable to single point failure in their communications wire. For example, if the communications wire were shorted or disconnected, the remotely located controls would for all practical purposes, be useless as they would not be able to receive or transmit information. This is an undesirable result for most consumers since they will lose the functionality of certain controls until they repair the vehicle. Accordingly, there is a need in the art to provide for a communications backup in the event of a fault in the communications wire between a remotely located and controlled device and the control infrastructure of a vehicle.

SUMMARY OF THE INVENTION

According to one aspect of the present invention, a primary or master node communicates via a standard multiplex protocol, such as those previously cited, to the control infrastructure of a vehicle. The master node, in a subnetwork or supplementary communications bus, further communicates with one or a plurality of slave nodes in a local vehicle area or structure such as a seat. The main multiplex network and subnetwork are bridged by the master node which transfers information between the main multiplex network and the subnetwork. By localizing at least a portion of the networking in the vehicle, the main multiplex network functions generally substantially independent of the subnetwork operation.

The master node in the subnetwork communicates over a first primary communications bus/wire to the slave nodes and transfers power via a secondary power bus/wire to the slave nodes. Accordingly, two wires using vehicle ground as a common reference connect the master node to a slave node to transfer communications and power. In alternate embodiments, an additional common reference wire may be provided. In the case of multiple slave nodes, wires may be daisy-chained from slave node to slave node to allow communications and power transfer from the master node.

In some situations, the primary communications bus/wire may be shorted or pulled high, preventing communication between the master node and the remotely located slave nodes, disabling the remote controls and actuators. In such a situation where the remote slave node is a seat adjusting motor or a window control switch, the seat and window will be inoperable. This result is unacceptable for most consumers since they expect to be able to adjust such devices in their vehicles regardless of faults in a vehicle. In the event of a failure in the primary communications bus/wire, the present invention will transmit information over the secondary power bus/wire.

In the present invention, the secondary power bus/wire has the capability to be used as a redundant communications bus between the master node and slave nodes. In the preferred embodiment, the data transmission over the secondary power bus/wire will be half duplex with only the master transmitting control commands to the slave node. In alternate embodiments, the transmission will be full duplex with the master sending commands to the slave and the slave sending commands and status information to the master node. In this manner, the subnetwork will be able to survive a failure in the primary communications bus/wire and enable a vehicle operator to fully operate the controls of the vehicle until the problem is fixed.

BRIEF DESCRIPTION OF THE DRAWINGS

The various advantages of the present invention will become apparent to those skilled in the art after reading the following specification and by reference to the drawings, in which.

DETAILED DESCRIPTION OF THE PREFERRED EMBODIMENT

The following description of the present invention is merely exemplary in nature and is in no way intended to limit the invention or its uses. Moreover, the following description, while depicting a redundant communication bus to be used in a vehicle, is intended to adequately teach one skilled in the art to make and use the redundant communications bus with any similar type communication applications.

Figure 1:
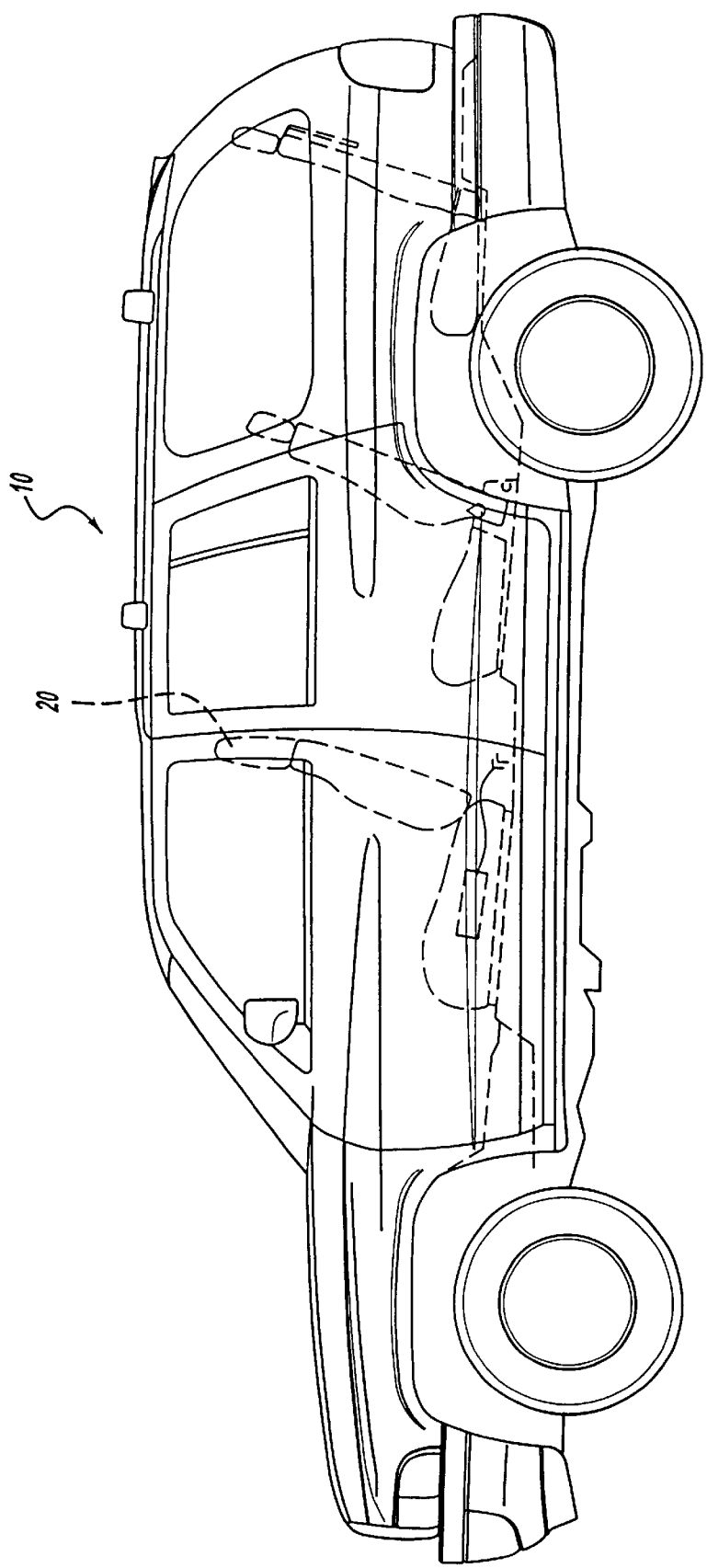
FIG. 1 is an elevational view of a vehicle having seats that incorporate the present invention according to the preferred embodiment of the present invention.
Figure 2:
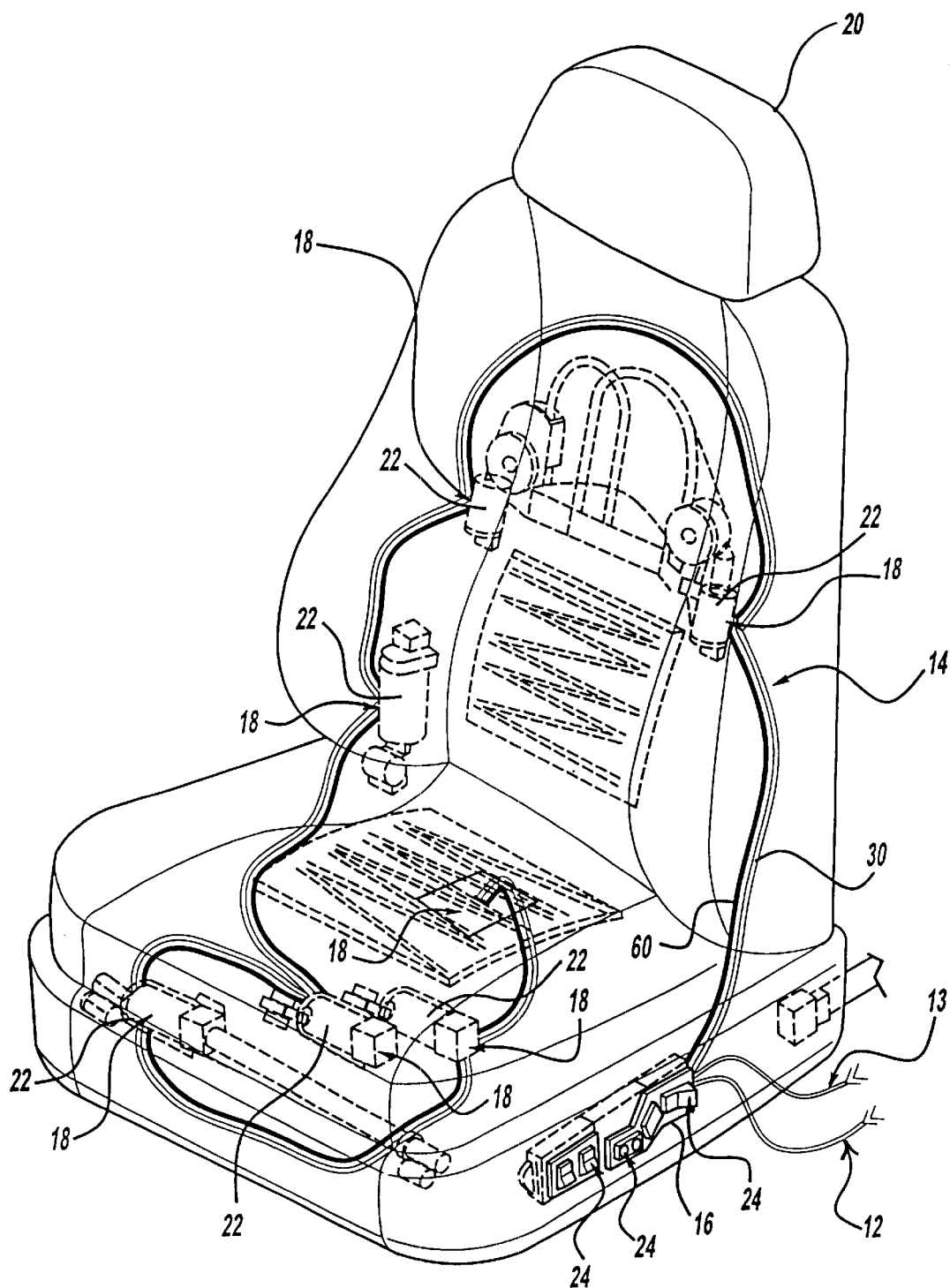
FIG. 2 is a perspective view of a seat incorporating the subnetwork of the present invention according to the preferred embodiment of the present invention.

FIGS. 1 and 2 illustrate a vehicle 10 having a multiplex bus 12 and a subnetwork 14 connecting a master control node 16 to slave nodes 18 located in a vehicle seat 20. In the preferred embodiment, each slave node 18 includes an actuator, such as a motor 22, but in alternate embodiments may include massage units, seat heaters, seat fans, sensors, switches or other various control devices and instrumentation. The master node 16 in a preferred embodiment includes seat switches 24 to generate commands to motors, heaters, and massage units in the seat 20, but is not limited to such. The master node 16 communicates with the vehicle control infrastructure, via the multiplex bus 12, and communicates with the slave nodes 18 via the subnetwork 14. The master node 16 receives power, via a power connection 13, from the electrical system of the vehicle. By localizing processing in the subnetwork 14 for controls located in the seat 20, overhead on the multiplex bus 12 is reduced, as compared to controls systems lacking a subnetwork 14, increasing the performance of the multiplex bus 12.

The slave nodes 18, including the motors 22, used in the vehicle seat are given specific node addresses within the subnetwork 14 to enable the master node 16 to communicate commands to each slave node 18. The master node 16 in turn has a specific node address on the multiplex bus 12 to communicate with the vehicle control infrastructure. The subnetwork 14 includes a primary communications bus/wire 30 and a secondary bus/wire 60 used to transmit power to each node 18 in the subnetwork 14. The primary communications bus/wire 30 and the secondary bus/wire 60 may comprise shielded twisted pair, coaxial cable, or any other wire used in the art of communications and power transmission. A common reference wire may also be connected from the master node 16 to the slave nodes 18.

Figure 3:
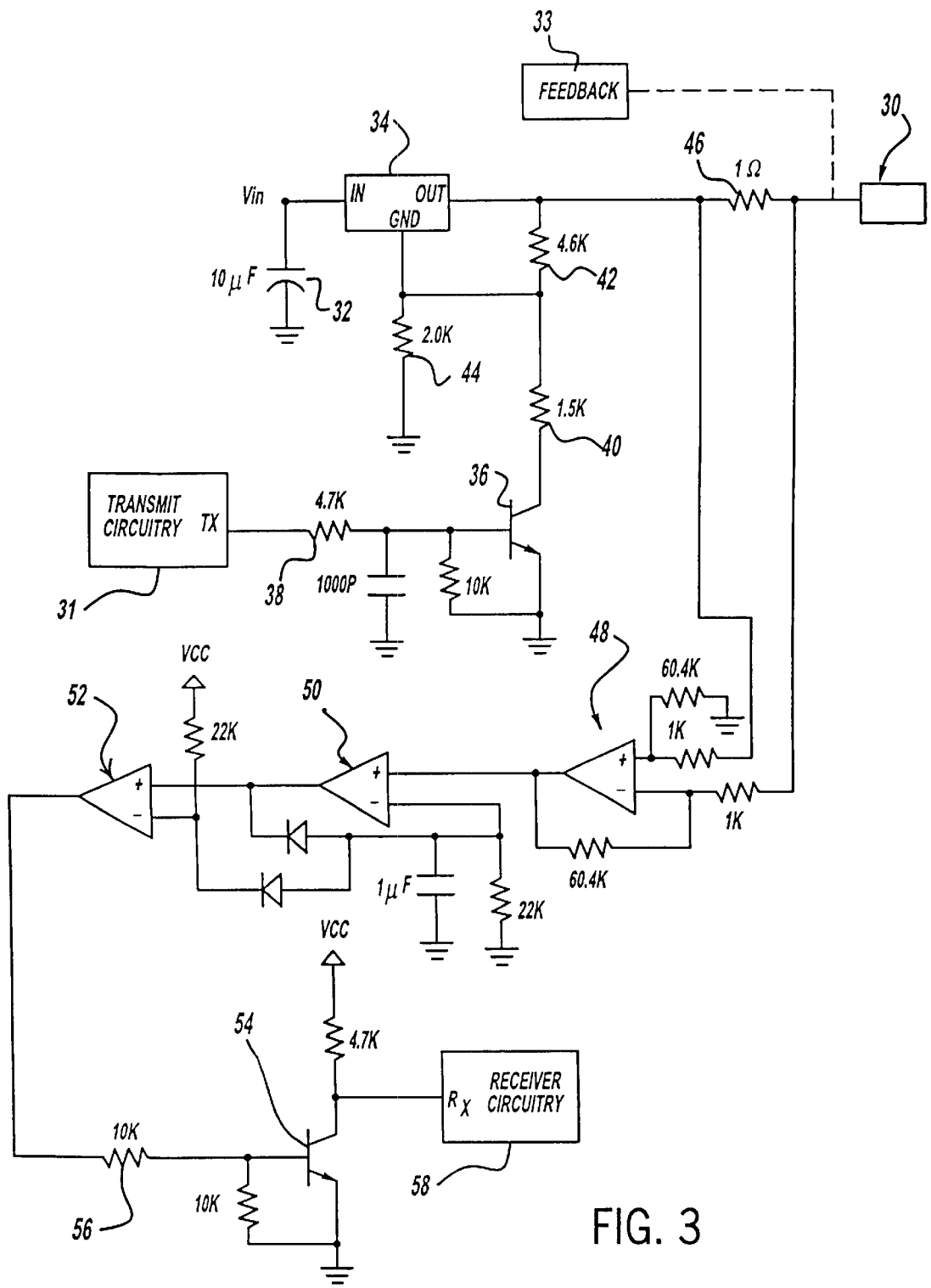
FIG. 3 is a diagram of the master node primary bus circuitry according to the preferred embodiment of the present invention.

FIG. 3 is a diagram of the master node 16 primary bus circuitry, illustrating the operation of the primary communications bus 30 of the subnetwork 14. Voltage Vin is supplied by a power source in a vehicle such as a car battery, via the master node 16, and is filtered by capacitor 32. Vin provides power to a regulated power supply 34 which drives communications from the master node 16 to the slave nodes 18 on the primary communications bus 30. Transmit circuitry 31 provides a modulated transmission signal TX applied to the base of a transistor 36 through a resistor 38. The transmission signal TX switches the transistor 36 on and off to modulate the voltage on the primary bus 30 via an array of resistors 40, 42, and 44. The modulated transmission signal TX on the primary communications bus 30 provides data encoded as digital serial information containing commands and other information to control the slave nodes 18. The serial information can be of any data format known in the art and may further include handshaking for data transfer in an asynchronous mode.

The master node 16 primary bus circuitry further includes the ability to receive information via the primary communications bus 30. A modulated signal transmitted from a slave node 18 will be transmitted through resistor 46. The resistor 46 acts as a current to voltage converter with the voltage drop over the resistor 46 applied to the input of a differential amplifier circuit 48. The amplifier circuit 48 amplifies the voltage drop over resistor 46 and outputs a signal to a peak detector 50. The peak detector 50 output is stepped to correspond to signal peaks and is further transmitted to a comparator 52 that squares the pulses of its input to provide sharp transitions between logic true and logic false conditions. The output of the comparator 52 is further applied to a pull down transistor 54 via a resistor 56. The pull down transistor 54 is switched on and off by the comparator 52 to create a modulated signal RX to the receiver circuitry 58 of the master node. The modulated transmission signal RX provides data encoded as digital serial information containing status and other information from the slave nodes 18.

A feedback element 33 is coupled to the primary communication bus 30 to detect if the primary communications bus/wire 30 is shorted, broken, or pulled high. The feedback element 33 is coupled to a microcontroller which controls the transmit circuitry 31.

Figure 4:
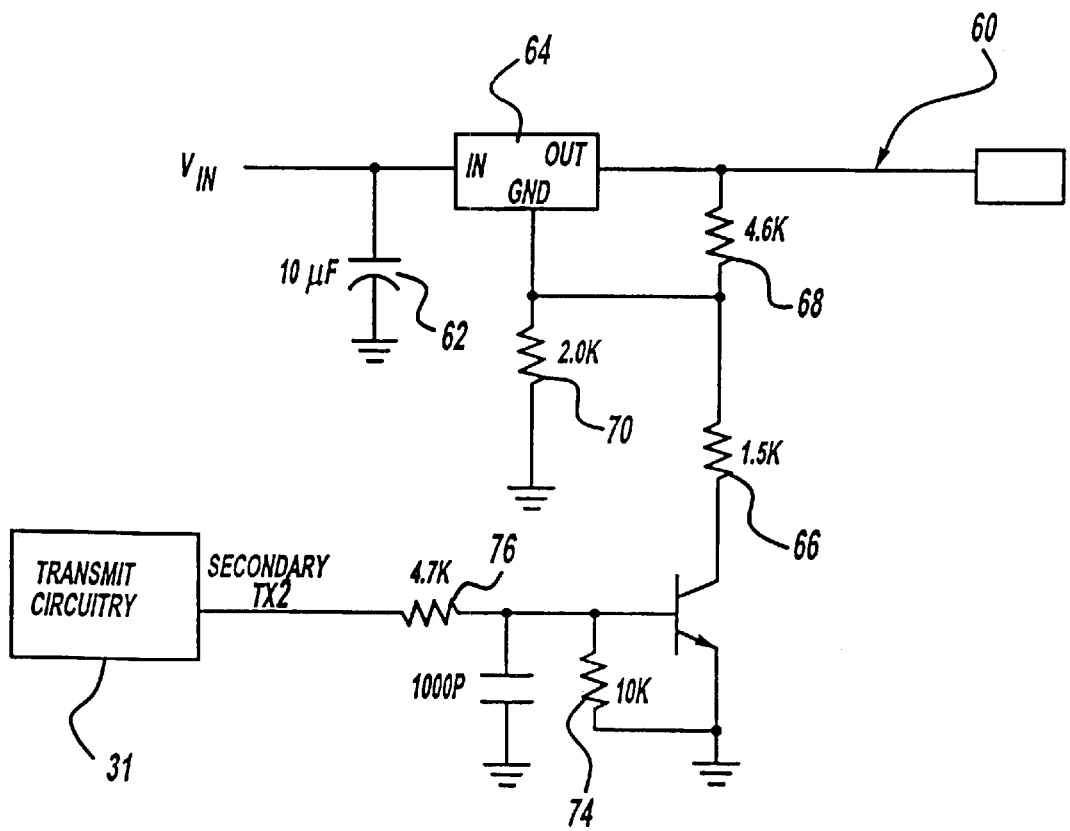
FIG. 4 is a diagram of the master node secondary bus circuitry according to the preferred embodiment of the present invention.

Referring to FIG. 4, a secondary power bus 60 circuitry is shown in diagrammatic form. Voltage Vin, as first referenced in FIG. 3, is supplied by a power source in a vehicle such as a car battery, via master node 16, and is filtered by capacitor 62. Vin provides power to a regulated power supply 64 which provides power from the master node 16 to the slave nodes 18 and can further drive the communications on the secondary power bus 60 upon failure of the primary communications bus 30. Upon detection of the failure of the communications bus 30 by the feedback element 33, the transmit circuitry 31 of the master control node 16 will transmit information over the power bus 60 to the slave nodes 18. The secondary power bus 60 thus has the dual function of power transmission and communications transmission from the master node 16 to the slave nodes 18.

Data is transmitted over the secondary power bus 60 in much the same manner as data is transmitted over the primary communications bus 30. The secondary transmission signal TX2 switches the transistor on and off to modulate the voltage on the secondary bus 60 via an array of resistors 66, 68, and 70. The secondary modulated transmission signal TX2 on the secondary bus provides data encoded as digital serial information containing commands and other information to control the slave nodes 18. Similar to the data transmitted on the primary bus 30, the serial information transmitted on the secondary bus 60 can be of any format known in the art. In the preferred embodiment, the transmission on the secondary bus 60 between the master node 16 and the slave nodes 18 is half duplex with the master node 16 sending commands and information to the slave nodes 18. In alternate embodiments of the present invention, full duplex communications on the secondary bus 60 between the master node 16 and the slave nodes 18, may be executed.

Figure 5:
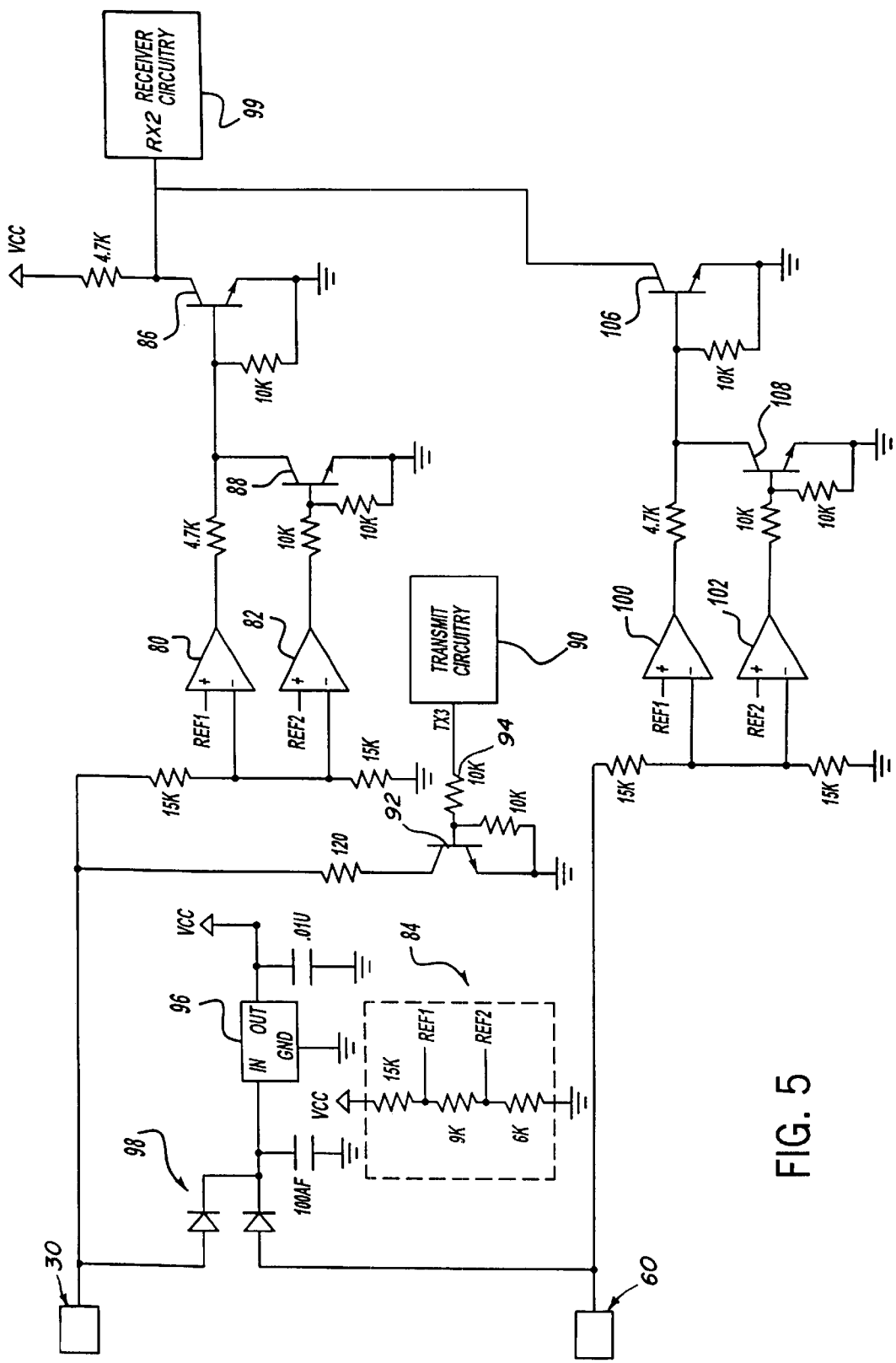
FIG. 5 is a diagram of a slave node communication circuitry according to the preferred embodiment of the present invention.

FIG. 5 is a diagrammatic illustration of the slave node 18 communication circuitry. The primary communications bus 30 signal is applied to window comparators 80 and 82. The window comparators 80 and 82 compare the voltage level of the primary communication signal to reference voltages REf1 and REf2. If the input signal of comparator 80 is greater than REf1, the output of the comparator 80 switches from logic high to logic low. If the input signal of comparator 82 is greater than REf2, the output of the comparator 82 switches from logic high to logic low. Reference voltages are provided by voltage divider 84 with REf1 having a greater value than REf2. The output of comparator 80 is applied to a transistor 86 and the output of comparator 82 is applied to a transistor 88. The transistors 86 and 88 are modulated by the outputs of comparators 80 and 82 to provide serial data RX2 to receiver circuitry 98 of the slave nodes 18. In the preferred embodiment, the serial data utilizes TTL levels for logic high and logic low levels.

When the primary communications bus 30 is shorted low, the comparators 80 and 82 switch from a logic low to a logic high. This in turn causes the transistor 88 to conduct and therefore temporarily removes the influence of the output from the comparator 80 on the transistor 86. As a result, the secondary power bus 60 will override the primary communications bus 60. Similarly, if the primary communications bus 30 is shorted high, the output from comparators 80 and 82 become logically low so the secondary power bus 60 again overrides the primary communications bus 30 as the transistor 86 becomes nonconductive. The comparators 100 and 102 function in a manner similar with respect to the secondary power bus 60 as do the comparators 80 and 82 with respect to the primary communications bus 30.

The primary communications bus 30 is also utilized by the slave nodes 18 to transfer information to the master node 16. Transmit circuitry 90 provides a modulated signal TX3 applied to a transistor 92 via a resistor 94. The transistor 92 will switch on and off in response to the modulated signal TX3 and modulate the power supply 96 to generate serial data transferred to the master node 16 via the primary communications bus 30. Diodes 98 allow current to flow in only one direction to the power supply 96 to prevent the power supply 96 from interfering with serial data sent from the master node 18 to the slave node 16 and interaction between the primary bus 30 and secondary bus 60.

The secondary power bus 60, as discussed previously, provides power from the master node to the slave node to operate motor actuators, electronics, and similar devices in the slave nodes 18. Upon the failure of the primary communications bus 30, the secondary power bus 60 is able to provide communications between the master node 16 and the slave nodes 18. Window comparators 100 and 102 coupled to the secondary power bus 60 and transistors 106 and 108 mirror the functions of window comparators 80 and 82 and transistors 86 and 88 to provide communications between the master node 16 and the slave node 18. In one embodiment of the present invention, data may be simultaneously transferred on both the primary communications bus 30 and the secondary power bus 60. The transmitted signal from the master node 16 and the slave nodes 18 on the primary bus 30 and the secondary bus 60 are clocked together to avoid interference for the receiver circuitry 98. In alternate embodiments, a microcontroller will only transmit data over the secondary bus 60 upon a detection of failure on the primary bus 30.

It is to be understood that the invention is not limited to the exact construction illustrated and described above, but that various changes and modifications may be made without departing from the spirit and scope of the invention.

We claim:

1. A method of communicating for a vehicle control system comprising:
   providing a communications bus between a first control apparatus and a second control apparatus in a vehicle;
   providing a power bus between said first control apparatus and said second control apparatus;
   detecting a failure of said communications bus; and
   providing communications over said power bus and said communications bus.

2. The method of claim 1, wherein at least one said control apparatus is located in a vehicle seat.

3. A communications architecture for a vehicle control system, said communications architecture comprising:
   a first node;
   a second node;
   a communications bus having a first wire connecting said first node and said second node and providing for information transfer between said first node and said second node;
   a power bus having a second wire connecting said first node and said second node and providing power to said second node from said first node; and
   a fault detector to determine if said communications bus is faulted, wherein said power bus transfers information between said first node and said second node in the event of a fault of said communications bus.

4. The communications architecture of claim 3, wherein said first node is a switch box.

5. The communications architecture of claim 3, wherein said first node and said second node are coupled to a vehicle seat.

6. The communications architecture of claim 3 wherein said common reference is provided by a third wire.

7. The communications architecture of claim 3 further including a multiplex bus to said first node to a control infrastructure of the vehicle.

8. The communications architecture of claim 3, wherein said communications bus is daisy-chained to multiple nodes to communicate with said first node.

9. The communications architecture of claim 3 further comprising a common reference for said communications bus and said power bus.

10. The communications architecture of claim 3, wherein said second node electric motor.

11. A vehicle communication system, comprising a controller having a communication circuit configured to communicate over a communications bus, wherein the controller is coupled to a power bus, wherein the controller is further configured to communicate over the power bus, wherein the controller is configured to detect a failure in the communications bus and to communicate over the power bus in response to detecting the failure.

12. The vehicle communication system of claim 11, wherein the controller is a slave controller configured to receive commands from a master controller via the communications bus and the power bus.

13. The vehicle communication system of claim 11, wherein the controller is a master controller configured to provide power to the power bus and to provide commands to the communications bus and to the power bus.

14. The vehicle communication system of claim 13, wherein the master controller is configured to receive power from the electrical system of the vehicle.

15. The vehicle communication system of claim 13, further comprising a slave controller coupled to the power bus and the communications bus and configured to receive commands from the communications bus and the power bus.

16. The vehicle communication system of claim 15, wherein the master controller is configured to receive power from the electrical system of the vehicle.

17. The vehicle communication system of claim 16, wherein the vehicle communication system includes a plurality of slave controllers coupled to a vehicle seat, each slave controller configured to operate a seat actuator in response to commands from the master controller.

18. The vehicle communication system of claim 13, wherein the master controller is configured to communicate with the vehicle control infrastructure via a multiplex bus.

19. The vehicle communication system of claim 11, wherein the controller is configured for half duplex communication on the power bus.

20. The vehicle communication system of claim 13, wherein the master controller is configured to provide sufficient power to the power bus to drive a motor.

21. A vehicle communication system, comprising:

a master controller coupled to a communications bus and a power bus, the master controller including a first means for communicating on the communications bus and a second means for providing power on the power bus and for communicating on the power bus; and a slave controller coupled to the communications bus and the power bus, the slave controller including a third means for communicating on the communications bus and a fourth means for receiving power from the power bus and for communicating on the power bus, wherein the master controller further comprises means for detecting a failure in the communications bus and for communicating over the power bus in response to detecting the failure.

22. The vehicle communication system of claim 21, wherein the slave controller is coupled to a vehicle.

23. The vehicle communication system of claim 21, wherein the master controller further comprises means for receiving power from electrical system of the vehicle.

\* \* \* \* \*

UNITED STATES PATENT AND TRADEMARK OFFICE
CERTIFICATE OF CORRECTION

PATENT NO.   : 6,404,326 B1
DATED        : June 11, 2002
INVENTOR(S)  : Ross G. Timmerman, Krzysztof R. Russa and Alan S. Hughes It is certified that error appears in the above-identified patent and that said Letters Patent is hereby corrected as shown below:

<u>Column 6,</u>
Line 29, please insert -- connect -- after "to".
Line 39, please insert -- includes an -- after "node".

<u>Column 8,</u>
Line 14, please insert -- seat -- after "vehicle".
Line 17, please insert -- the -- after "from".

Signed and Sealed this

Eighth Day of October, 2002

*Attest:*

*Attesting Officer*

JAMES E. ROGAN
*Director of the United States Patent and Trademark Office*